United States Patent [19]

Kawabe et al.

[11] Patent Number: 5,094,473
[45] Date of Patent: Mar. 10, 1992

[54] VEHICLE SUSPENSION SYSTEM

[75] Inventors: Yoshihiro Kawabe; Hiroshi Tonomura, both of Yokosuka; Moritsune Nakata, Yokohama, all of Japan

[73] Assignee: Nissan Motor Company, Ltd., Yokohama, Japan

[21] Appl. No.: 581,627

[22] Filed: Sep. 12, 1990

[30] Foreign Application Priority Data

Sep. 12, 1989 [JP] Japan .................. 1-237996

[51] Int. Cl.$^5$ ............................................. B62D 17/00
[52] U.S. Cl. ..................................... 280/675; 280/673
[58] Field of Search ............................... 280/673, 675

[56] References Cited

U.S. PATENT DOCUMENTS 3,858,901  1/1975  Johnson ................. 280/675
4,603,881  8/1986  Mikina ................... 280/675

FOREIGN PATENT DOCUMENTS 62-218209  9/1987  Japan .

Primary Examiner—Kenneth R. Rice
Attorney, Agent, or Firm—Pennie & Edmonds

[57] ABSTRACT

The instantaneous centers of rotation of the front and the rear suspensions of a vehicle are defined by an intersection of lines drawn parallel to the axes of the inboard ends of the respective upper and lower links and passing through the ball joints provided at the outboard ends of the respective upper and lower links. The instantaneous centers of rotation of the front and the rear suspensions are located at approximately the same height and distance on either side of the center of gravity of the vehicle.

6 Claims, 5 Drawing Sheets

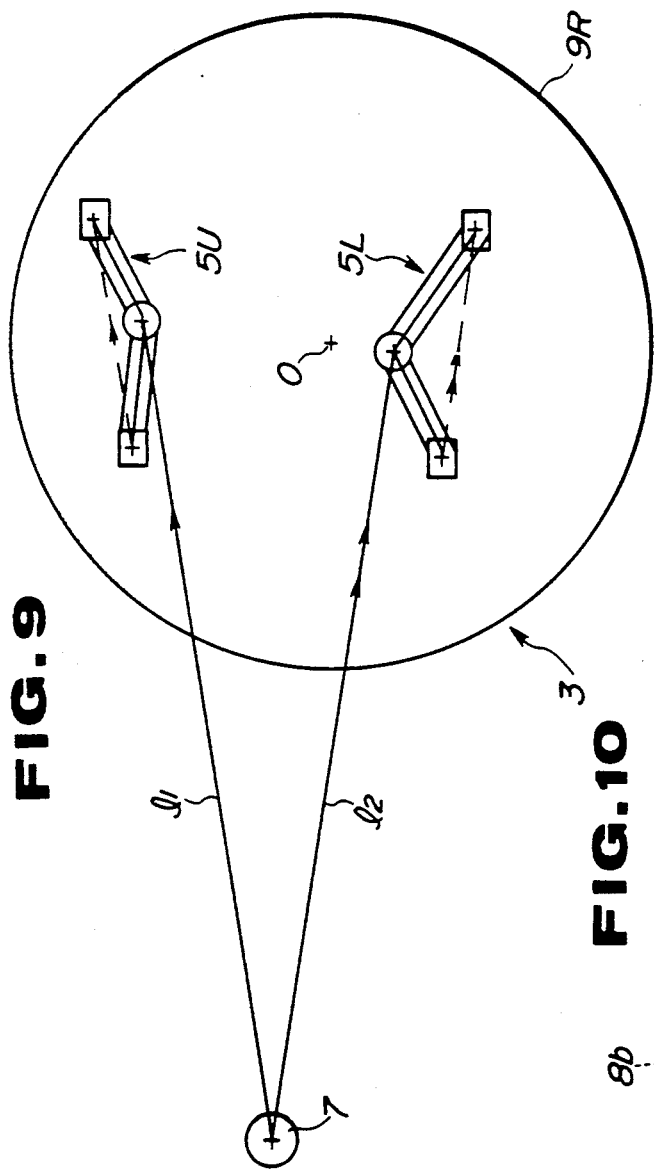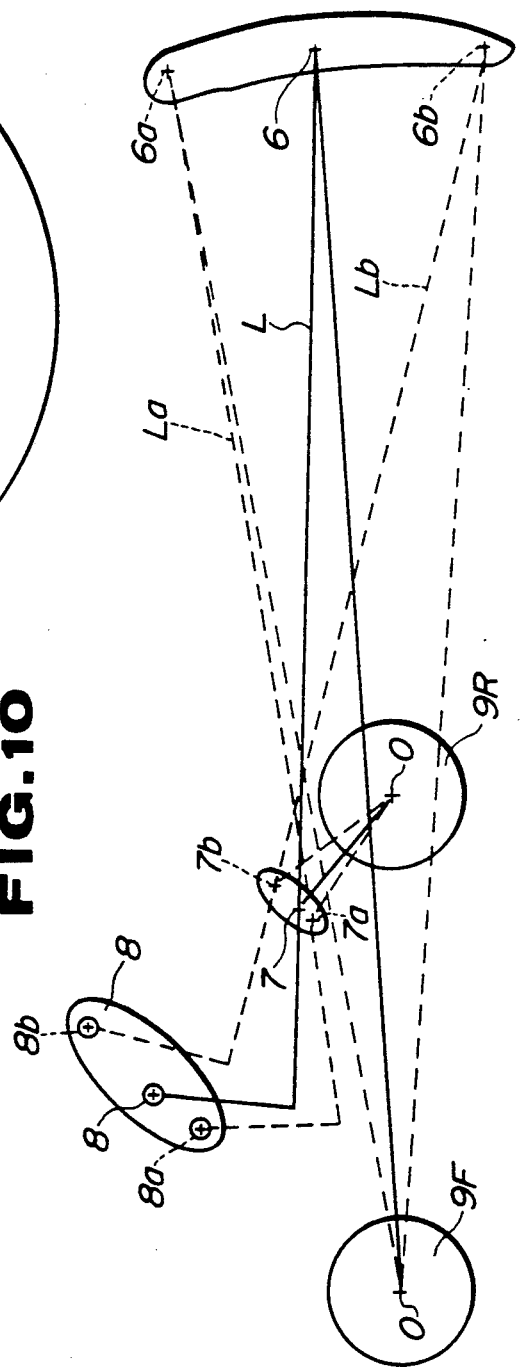

VEHICLE SUSPENSION SYSTEM

BACKGROUND OF THE INVENTION

1. Field of the Invention

The present invention relates generally to a vehicle suspension and more specifically to a vehicle suspension system which reduces the loss of ride and associated stability characteristics during vehicle pitching.

2. Description of the Prior Art

JP-A-62-218209 discloses a suspension arrangement of the nature disclosed in FIGS. 8-10. As shown in FIG. 8, the front and rear suspensions 2, 3 of the vehicle 1, comprise so called A-arm type upper and lower links 4U, 5U, 4L, 5L. These arms are arranged at suitable angles with respect to the longitudinal axis of the vehicle in a manner such that the front suspension 2 defines an anti-diving geometry while the rear suspension defines an antilifting geometry. This arrangement defines an instantaneous center of rotation for the front suspension at a location, which is illustrated in FIG. 8, is low and well rear of the vehicle; and a corresponding center 7 for the rear suspension which is located rear of the vehicle center of gravity 8 and forward of the rear suspension.

As shown in FIG. 9, the rear suspension is such that the pivot points (i.e. ball joints which interconnect the links with the rear road wheel 9R) defined at the outboard ends of the upper and lower links 5U and 5L, are arranged with respect to and spaced from the instantaneous center of rotation 7 of the rear suspension as indicated by lines 11 and 12: A similar arrangement is establised for the front suspension.

Accordingly, if we consider the oscillation of the front and rear suspensions, it can be considered that the wheel centers of the front and rear road wheels 9F, 9R are respectively connected to the instantaneous centers of rotation 6 and 7 by (imaginary) links.

However, with this type of suspension arrangement, as the instantaneous center of rotation 6 is located low and well to the rear of the vehicle chassis and the instantaneous center of rotation 7 is located between the center of gravity 8 of the vehicle and the center of the rear wheel 9R, the vertical displacement of the center of gravity 8 tends to become quite large and thus tends to deteriorate the ride and stability characteristics of the vehicle during vehicle pitching.

That is to say, if the vehicle is viewed from the side, it is possible to envisage a model of the nature depicted in FIG. 10. In the system depicted in this figure, the wheel centers O of the front and rear wheels 9F, 9R are fixed and the movement of the line L which passes through the centers of instantaneous rotation 6, 7 depicts the movement of the vehicle center of gravity. Further, 6a and 7a and 6b and 7b depict the positions assumed by the instantaneous centers of rotation when the vehicle undergoes forward and rear inclinations respectively. Accordingly, the link L undergoes inclination, and the vehicle center 8 of gravity which is located at a fixed predetermined location with respect to line L, is induced to move. As will be appreciated from this figure, with this prior art type of suspension configuration, the vertical displacement of the vehicle center of gravity 8 is quite large when the vehicle undergoes pitching and degrades the ride experienced by those onboard the vehicle.

SUMMARY OF THE INVENTION

It is an object of the present invention to provide a vehicle suspension configuration which reduces the vertical displacement of the vehicle center of gravity and thus improves the vehicle ride characteristics when the vehicle is subject to pitching.

In brief, this object is achieved by an arrangement wherein the instantaneous centers of rotation of front and rear suspensions a vehicle are defined by an intersection of lines drawn parallel to the axes of the inboard ends of the respective upper and lower links and passing through the ball joints provided at the outboard ends of the respective upper and lower links. The instantaneous centers of rotation of the front and the rear suspensions are located at approximately the same height and distance on either side of the center of gravity of the vehicle.

More specifically, a first aspect of the present invention comes in suspension system for an automotive vehicle having a center of gravity and which features: front suspension link means for defining a first momentary center of rotation which is located aft of the center of gravity of the vehicle by first predetermined distance taken in the longitudinal direction of the vehicle and at a first height which is essentially the same as the height of the center of gravity; and rear suspension link means for defining a second momentary center of rotation which is located ahead of the center of gravity of the vehicle by a second predetermined distance taken in the longitudinal direction of the vehicle and at a second height which is essentially the same as the height of the center of gravity, the second predetermined distance being essentially the same as the first predetermined distance.

A second aspect of the present invention comes in a suspension system for an automotive vehicle having a center of gravity comprising: a front suspension having first and second links which extend laterally outward from the vehicle and which are pivotal about first and second axes which extend in the fore and aft directions of the vehicle, the first link being arranged above the second link, the outboard ends of the first and second links respectively having first and second joint means for supporting a forward road wheel; a rear suspension having third and fourth links which extend laterally outward from the vehicle and which are pivotal about third and fourth axes which extend in the fore and aft directions of the vehicle, the third link being arranged above the fourth link, the outboard ends of the third and fourth links respectively having third and fourth joint means for supporting a rear road wheel; a first momentary center of rotation defined at the intersection of first and second lines which extend parallel to the first and second axes and which pass through the first and second joints means, respectively, the first momentary center of rotation being located aft of the center of gravity of the vehicle; and a second momentary center of rotation defined at the intersection of third and fourth lines which extend parallel to the third and fourth axes and which pass through the third and fourth joints means, respectively, the second momentary center of rotation being located ahead of the center of gravity of the vehicle; the first and second momentary centers of rotation being located so that the mid point of a fifth line which joins the two centers is located proximate the center of gravity of the vehicle.

BRIEF DESCRIPTION OF THE DRAWINGS

FIG. 9 shows the arrangement of the prior art rear suspension and the relationships established between the rear suspension members and the associated instantaneous center of rotation; and FIG. 10 is a model depicting the vertical displacement of the vehicle center of gravity which is produced with the prior art suspension configuration shown in FIG. 8.

DETAILED DESCRIPTION OF THE PREFERRED EMBODIMENTS

Figure 1:
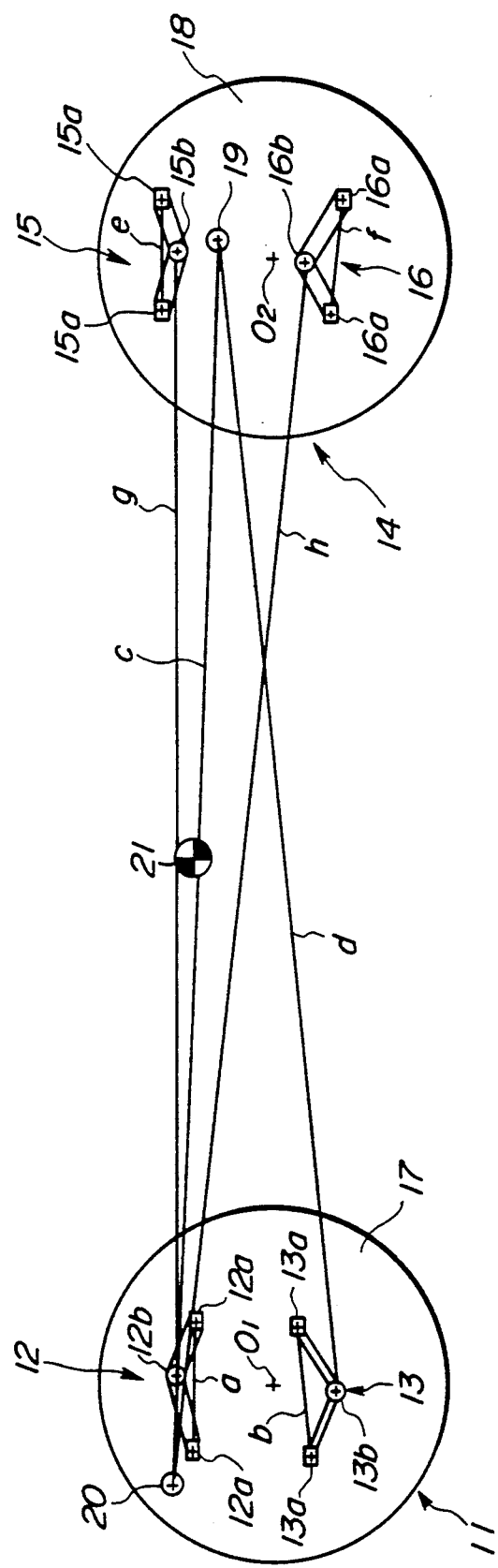
FIG. 1 is a schematic representation showing a skeletal outline of a suspension according to a first embodiment of the present invention.
Figure 2:
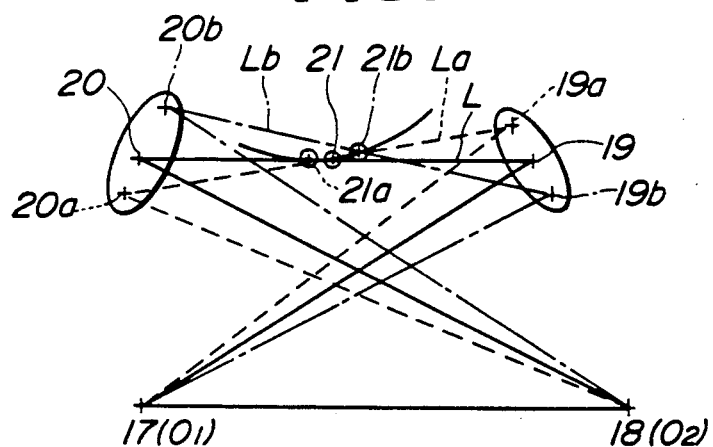
FIG. 2 is a diagram which demonstrates the amount of movement the vehicle center of gravity undergoes in response to movement of the instantaneous centers of rotation of the front and rear suspensions.

FIGS. 1 and 2 show a suspension configuration according to a first embodiment of the present invention. In this arrangement a front suspension 11 comprises upper and lower A-arm type links 12, 13. A rear suspension 14 comprises upper and lower A-arm type links 15, 16. The inboard ends of the A-arm links are pivotally connected to the vehicle chassis (not shown in the figures) via suitable hinge type joints 12a, 13a, 15a and 16a. The outboard ends of each of the links are connected to road wheels through suitable ball joints 12b, 13b, 15b and 16b.

The axes a, b, c and d about which the inboard ends of the A-arm links are pivoted are oriented in such a manner that the instantaneous centers of rotation 19, 20 of the front and rear suspensions are located at the intersection of lines c and d and g and h respectively. As will be noted line c is parallel with the line a and passes through ball joint 12b. Similarly, lines d, g and h pass through the ball joints 13b, 15b and 16b and extend in a parallel relationship with lines b, e and f, respectively.

With this arrangement the instantaneous center of rotation 19 is located aft of the vehicle center of gravity 21 by a predetermined distance while that of the rear suspension is located forward of the center of gravity 21 by essentially the same distance. The two instantaneous centers of rotation 19, 20 are located at about the same height as the center of gravity 21.

With this arrangement, given that the wheel centers $O_1$, $O_2$ are fixed, the imaginary link L which interconnects the two instantaneous centers of rotation 19, 20 can move between the limits indicated by La and Lb in FIG. 2.

As will be appreciated from FIG. 2 the center of the link L is located close to the center of gravity 21. Accordingly, if the vehicle undergoes pitching (La, Lb denotes forward and rearward inclination, respectively) the amount of vertical displacement of the center of gravity 21 is extremely small and the ride characteristics of the vehicle are markedly improved thus improving the passengers sense of stability.

Figure 3:
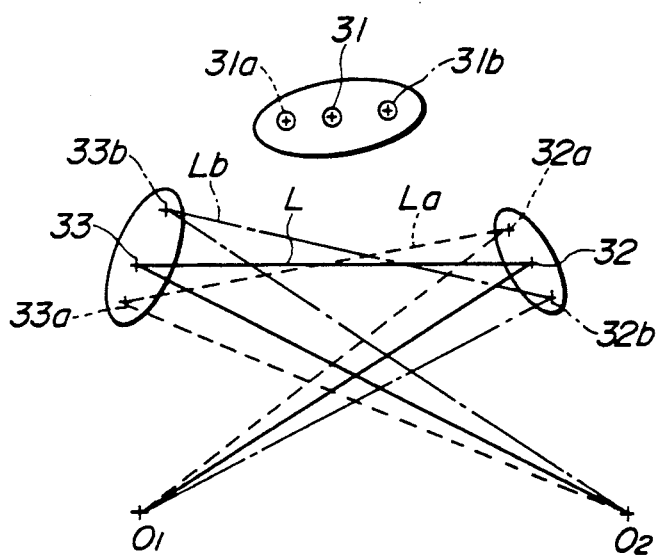
FIGS. 3 and 4 are diagrams similar to that shown in FIG. 2 but which show the effects produced by variants of the basic arrangement of the first embodiment.
Figure 4:
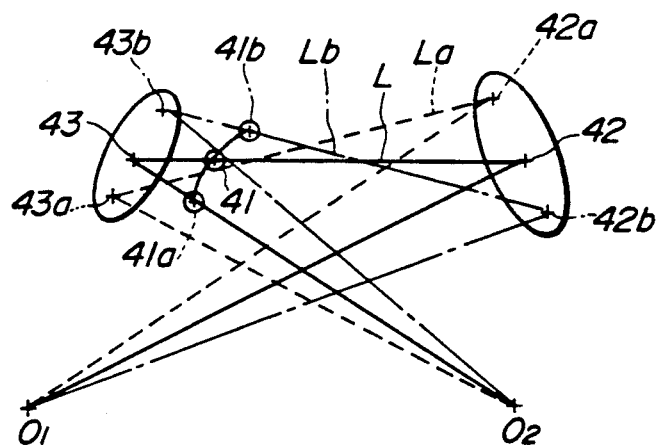

FIGS. 3 and 4 show arrangements which are basically similar to the first embodiment but wherein a vehicle center of gravity 31 is located above the line interconnecting the instantaneous centers of rotation 32, 33 (FIG. 3) and wherein a center of gravity 41 is arranged to be below the line interconnecting the two instantaneous centers of rotation 42, 43 (FIG. 4).

As will be appreciated from these figures, the amount of vertical displacement the vehicle center of gravities 31, 41 undergo in response to the movement of the instantaneous centers of rotation, is markedly greater than in the case of the FIG. 1 arrangement. Accordingly, it becomes apparent that arranging the instantaneous centers of rotation at essentially the same height as the center of gravity of the vehicle is an essential requirement for achieving the object of the present invention.

Figure 5:
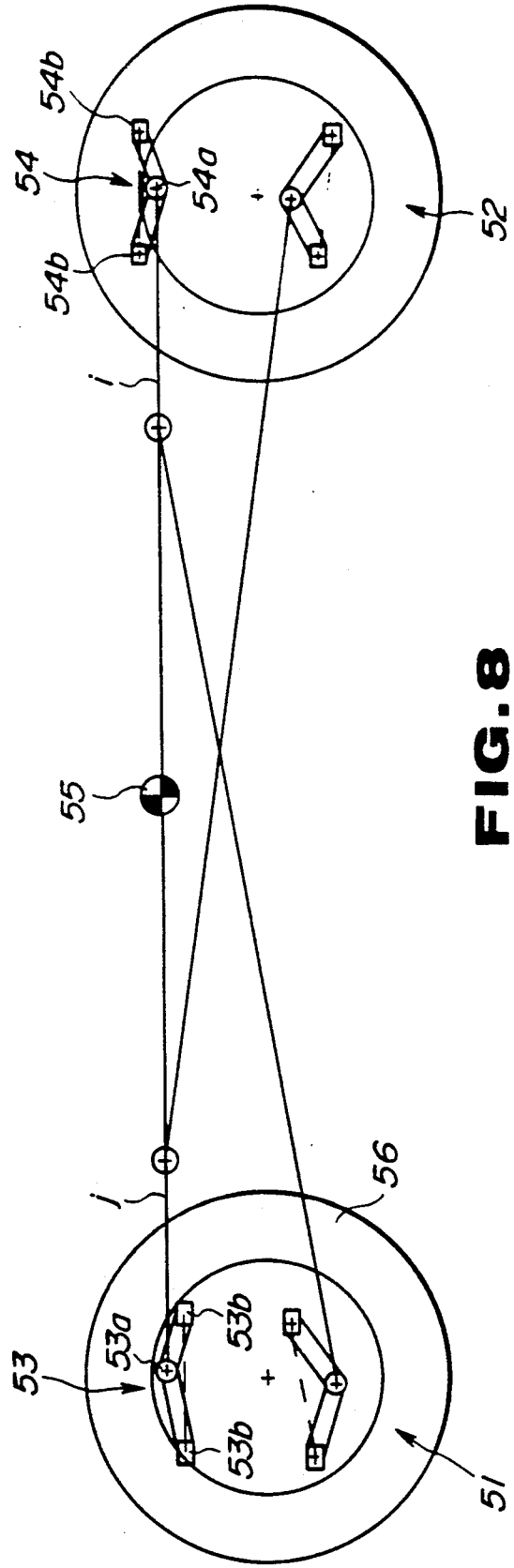
FIGS. 5 shows the schematic configuration of a second embodiment of the present invention.
Figure 8:
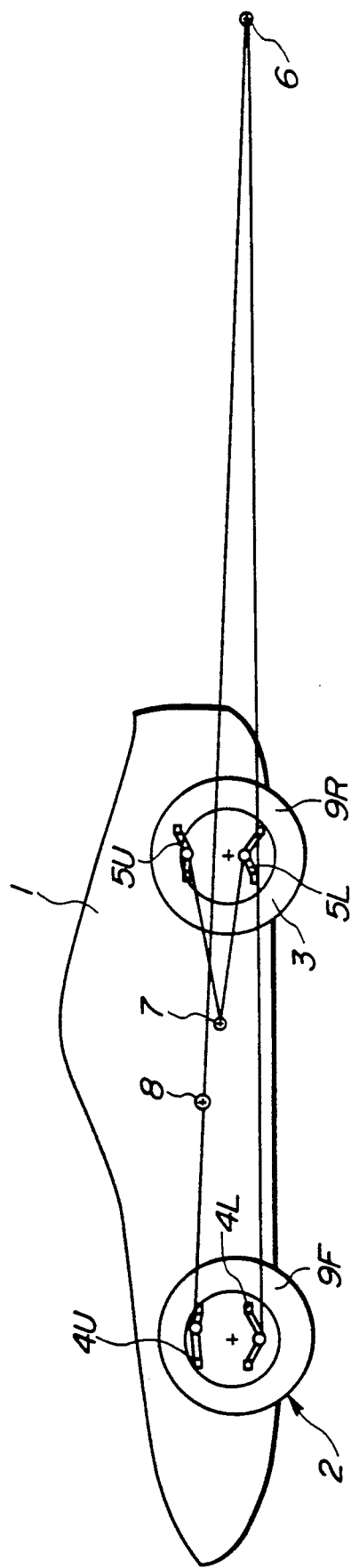
FIGS. 8 shows the prior art suspension configuration discussed in opening paragraphs of the instant disclosure.
Figure 6:
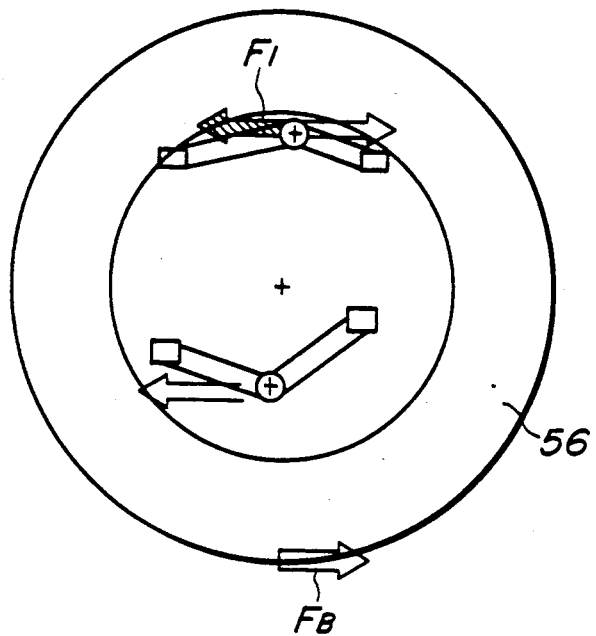
FIG. 6 shows the manner in which control forces are applied to the front wheels of the second embodiment during braking.
Figure 7:
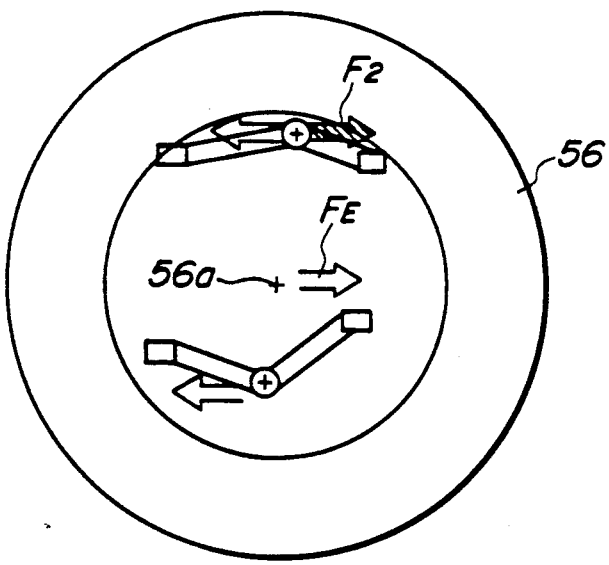
FIG. 7 shows the forces which act on the rear wheels when the vehicle undergoes engine braking.

FIGS. 5-7 show a second embodiment of the present invention. In this arrangement the upper links 53, 54 of the front and rear suspensions 51, 52 are horizontal and arranged so that the height of the outboard ends 53a and 54a are essentially the same as the center of gravity 55 of the vehicle. In addition, the inboard ends 53b and 54b are pivoted about axes which horizontal and parallel with lines i and j.

This embodiment provides the effect as that shown in FIG. 1. That is to say, as shown in FIG. 6 during braking when a force $F_B$ is produced between the wheel (tire) 56 and road surface, a force $F_1$ is generated at the upper links of both the forward and rear suspensions (only the case of the front suspension being illustrated for simplicity) which acts toward the front of the vehicle. On the other hand, during engine braking the force $F_E$ which generated at the wheel center 56a (see FIG. 7) is such as to be accompanied by a force $F_2$ which acts in the same direction toward the rear of the vehicle. This enables the oscillation of the upper links to be reduced along with the change in the amount compliance steering which occurs.

What is claimed is:

1. A suspension system for an automotive vehicle having a center of gravity comprising:

front suspension linkage means, which operatively connects to a front wheel, defining a first momentary center of rotation which is located aft of the center of gravity of the vehicle by a first predetermined distance taken in the longitudinal direction of the vehicle and at a first height which is essentially the same as the height of the center of gravity; and rear suspension linkage means, which operatively connects to a rear wheel, defining a second momentary center of rotation which is located ahead of the center of gravity of the vehicle by a second predetermined distance taken in the longitudinal direction of the vehicle and at a second height which is essentially the same as the height of the center of gravity, said second predetermined distance being essentially the same as the first distance, wherein said first and said second momentary centers of rotation are located proximate the rear wheel and the front wheel, respectively.

2. A suspension system for an automotive vehicle having a center of gravity comprising:
- a front suspension having first and second linkages which extend laterally outward from the vehicle and which pivot about first and second axes which extend generally in the fore and aft direction of the vehicle, the first linkage being arranged above the second linkage, the outboard ends of said first and second linkages respectively having first and second joint means for supporting a front wheel;
- a rear suspension having third and fourth linkages which extend laterally outward from the vehicle and which pivot about third and fourth axes which extend generally in the fore and aft direction of the vehicle, the third linkage being arranged above the fourth linkage, the outboard ends of said third and fourth linkages respectively having third and fourth joint means for supporting a rear wheel;
- a first momentary center of rotation defined at the intersection of first and second lines which extend parallel to said first and second axes, respectively and which pass through the first and second joint means, respectively, said first momentary center of rotation being located aft of the center of gravity of the vehicle and adjacent said rear wheel; and
- a second momentary center of rotation defined at the intersection of third and fourth lines which extend parallel to said third and fourth axes, respectively and which pass through the third and fourth joint means, respectively, said second momentary center of rotation being located ahead of the center of gravity of the vehicle and adjacent said front wheel;
- said first and second momentary centers of rotation being located so that a mid point of a fifth line which joins the two centers is located proximate the same height as the center of gravity of the vehicle, said fifth line having a length which is less than or slightly greater than the distance between axes of rotation of the front wheel and the rear wheel.

3. A suspension system according to claim 2, wherein said one of said first and second momentary centers of rotation is below the first and third linkages of the front and rear suspensions.

4. A suspension system according to claim 2, wherein said fifth line passes through the center of gravity and wherein the length of the fifth line is less than the distance between the axes of rotation of the front and rear wheels.

5. A suspension system according to claim 2, wherein the first momentary center of rotation is located between the center of gravity and the first linkage of the front suspension and the second momentary center of rotation is located between the center of gravity and the third linkage of the rear suspension.

6. A suspension system for an automotive vehicle having a center of gravity comprising:
- a front suspension having first and second linkages which extend laterally outward from the vehicle and which pivot about first and second axes which extend generally in the fore and aft direction of the vehicle, the first linkage being arranged above the second linkage, outboard ends of said first and second linkages respectively having first and second joint means for supporting a front wheel;
- a rear suspension having third and fourth linkages which extend laterally outward from the vehicle and which pivot about third and fourth axes which extend generally in the fore and aft direction of the vehicle, the third linkage being arranged above the fourth linkage, outboard ends of said third and fourth linkages respectively having third and fourth joint means for supporting a rear wheel;
- a first momentary center of rotation defined at the intersection of first and second lines which extend parallel to said first and second axes and which pass through the first and second joint means, respectively, said first momentary center of rotation being located aft of the center of gravity of the vehicle; and
- a second momentary center of rotation defined at the intersection of third and fourth lines which extend parallel to said third and fourth axes and which pass through the third and fourth joint means, respectively, said second momentary center of rotation being located ahead of the center of gravity of the vehicle,
- wherein said first and second momentary centers of rotation being located so that a fifth line which joins the two centers is located proximate the same height as the height of the center of gravity of the vehicle.

* * * * *